United States Patent
Allen, Jr. et al.

(10) Patent No.: US 8,807,323 B2
(45) Date of Patent: Aug. 19, 2014

(54) CONVEYOR HAVING BOTTOM OPENING FOR ACCOMMODATING A CONVEYOR SUPPORT STRUCTURE AND METHOD OF USING SAME

(75) Inventors: Clarence C. Allen, Jr., Mt. Crawford, VA (US); Kevin G. Gorby, Harrisonburg, VA (US); Eric H. Crowe, Weyers Cave, VA (US); Samantha L. J. Armstrong, Churchville, VA (US)

(73) Assignee: A. G. Stacker, Inc., Weyers Cave, VA (US)

( * ) Notice: Subject to any disclaimer, the term of this patent is extended or adjusted under 35 U.S.C. 154(b) by 167 days.

(21) Appl. No.: 13/598,830

(22) Filed: Aug. 30, 2012

(65) Prior Publication Data

US 2013/0306442 A1 Nov. 21, 2013

Related U.S. Application Data

(60) Provisional application No. 61/648,204, filed on May 17, 2012.

(51) Int. Cl.
*B65G 47/84* (2006.01)

(52) U.S. Cl.
USPC ................................ 198/463.3; 198/860.1

(58) Field of Classification Search
USPC ............. 198/860.1, 861.1, 313, 369.1, 369.5, 198/463.3
See application file for complete search history.

(56) References Cited

U.S. PATENT DOCUMENTS

| 4,684,314 A * | 8/1987 | Luth ......................... 198/861.1 |
| 6,220,420 B1 * | 4/2001 | Jan et al. ................... 198/369.1 |
| 7,284,651 B2 * | 10/2007 | Heinemeier et al. ....... 198/345.3 |
| 2003/0075657 A1 * | 4/2003 | Joubert ..................... 248/277.1 |
| 2006/0283687 A1 * | 12/2006 | Heinemeier et al. ....... 198/345.3 |

FOREIGN PATENT DOCUMENTS

| WO | 86/06355 | * 11/1986 |
| WO | 95/10468 | * 4/1995 |

* cited by examiner

*Primary Examiner* — James R Bidwell
(74) *Attorney, Agent, or Firm* — J-Tek Law PLLC; Jeffrey D. Tekanic; Scott T. Wakeman

(57) ABSTRACT

A conveyor includes a frame having first and second spaced frame elements, first and second drive rollers between the frame elements, and a flexible belt mounted between the first and second drive rollers that has a load bearing portion and a return portion, the return portion extending between the first and second frame elements. The conveyor has a first end portion including the first drive roller, a second end portion including the second drive roller and a central portion including a midpoint between the first drive roller and the second drive roller, and the central portion of the conveyor includes a lift-table receiving space between the first drive roller and the second drive roller and between the first frame element and the second frame element, and the return portion of the belt extends between the load bearing portion and the lift-table-receiving space.

13 Claims, 9 Drawing Sheets

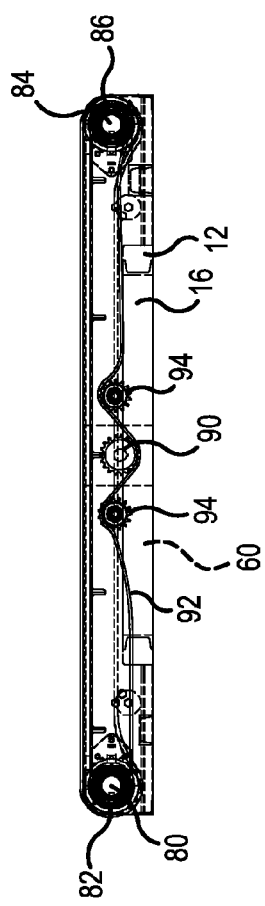
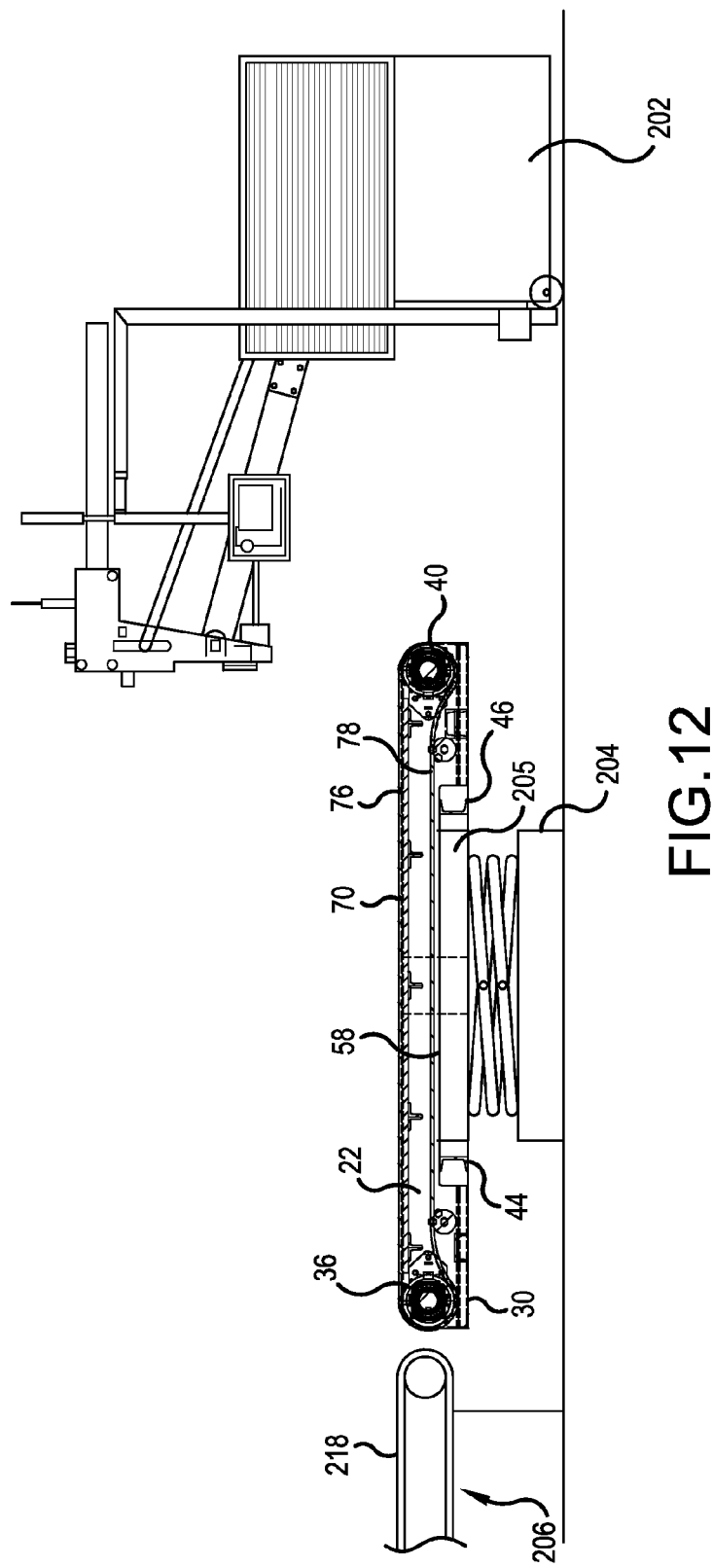

CONVEYOR HAVING BOTTOM OPENING FOR ACCOMMODATING A CONVEYOR SUPPORT STRUCTURE AND METHOD OF USING SAME

CROSS-REFERENCE TO RELATED APPLICATIONS

The present application claims the benefit of U.S. Provisional Patent Application No. 61/648,204, filed May 17, 2012, the entire contents of which are hereby incorporated by reference.

FIELD OF THE INVENTION

The present invention is directed toward a conveyor that is mountable on a support structure such as a lift table and toward a method of using same, and, more specifically, toward a conveyor having a bottom opening configured to receive part of a lift table to reduce a combined height of the conveyor and lift table when the conveyor is mounted on the lift table and toward a method of using same.

BACKGROUND OF THE INVENTION

Conventional conveyors, such as conveyor 200 illustrated in FIGS. 1-3, are often constructed to have an upper conveyor belt surface that is located 12 inches above the floor or ground or other surface on which the conveyor 200 is mounted. This standard height makes it easier for conveyors to be integrated into existing production lines, many other elements of which are designed to work with a 12 inch conveyor height. Conveyors having belt surfaces located at greater heights can be provided by mounting a standard-height conveyor on a platform. However, in order to accommodate a belt return and associated tensioning rollers 214 and the conveyor drive shaft 212, it is difficult to make conveyors that are significantly shorter than the standard 12 inch height.

Various known stacking devices 202 are designed to form stacks of material on a conveyor that is mounted on a lift table. A lift table 204 having a platform 205 supporting the conveyor 200 is illustrated in FIGS. 4 and 5. A stacking process begins with the lift table 204 in a raised position (FIG. 4) so that items exiting the stacker 202 fall a predetermined distance onto the conveyor 200 and form a stack (not illustrated). As the stack increases in height, the lift table 204 lowers the stack to maintain the predetermined distance between the discharge end of the stacker 202 and the top of the stack. When the stack has reached a desired height, the lift table 204 is operated to bring the top of the conveyor 200 to the standard 12 inch height so that the stack can be transferred onto an adjacent conveyor 206.

As previously noted, the adjacent conveyor 206 will generally have a load carrying surface 218 located 12 inches above the floor. However, given that the lift table 204 has a minimum height of 8 to 12 inches from its bottom to the top of the platform 205, and that it is difficult to make a conveyor 200 having a height less than 12 inches, the lift table 204 cannot lower a conventional conveyor 200 to the 12-inch height necessary for transferring a stack to the adjacent conveyor 206. Therefore, in conventional facilities using stackers 202 and conveyors 200 mounted on lift tables 204, a pit 208 is often dug in the floor 210 next to the stacker 202 so that the lift table 204 can be mounted in the pit 208. This allows the lift table 204 to lower the conveyor 200 close to, even with, or beneath the level of the floor 210 as necessary to bring the top surface of the conveyor 200 to the 12-inch height and align it with the load carrying surface 218 of the adjacent conveyor 206.

Digging a pit in a plant floor is undesirable for many reasons. First, there is an expense involved with digging and lining the pit and, in some cases, sealing the pit against water leakage. Moreover, after the pit is dug, any change in the layout of the manufacturing or processing line must either work around the location of the pit, or the pit must be filled in and a new pit dug in a new location. This reduces the flexibility of the line an increases the cost of any changes. If the pit is significantly larger than the lift table to be mounted therein, the pit may also pose a safety hazard and require appropriate marking, guards, etc. Alternately, raising the stacking device and all other equipment to a non-standard height of 20 inches, for example, would be cost prohibitive. It would therefore be desirable to provide a conveyor that can be used with a lift table and lowered to a 12 inch height without the use of a pit.

SUMMARY OF THE INVENTION

These and other problems are addressed by embodiments of the present invention, a first aspect of which comprises a conveyor having a frame with first and second spaced frame elements having outer sides and facing inner sides. First and second drive rollers are mounted between the first and second frame elements, and a flexible belt is mounted on the first and second drive rollers. First and second drive wheels are connected to the first and second drive rollers, and a drive is operably connected to the first and second drive wheels and configured to drive the belt in a first direction and in a second direction opposite the first direction.

Another aspect of the invention comprises a conveyor having a frame with first and second spaced frame elements each having a top, a bottom, an outer side and an inner side. The inner side of the first frame element faces the inner side of the second frame element, and the conveyor includes first and second drive rollers, each having a diameter, between the first and second frame elements. A flexible belt is mounted between the first and second drive rollers and has a load bearing portion and a return portion, and the return portion extends between the inner sides of the first and second frame elements. The conveyor further comprises a first end portion including the first drive roller, a second end portion including the second drive roller and a central portion including a midpoint between the first drive roller and the second drive roller. The central portion of the conveyor includes a lift-table receiving space between the first drive roller and the second drive roller and between the first frame element and the second frame element, and the return portion of the belt extends between the load bearing portion and the lift-table-receiving space.

A further aspect of the invention comprises a conveyor having a frame with first and second spaced frame elements having outer sides and facing inner sides, first and second drive rollers between the first and second frame elements, a flexible belt mounted on the first and second drive rollers, and drive means for driving the first drive roller in a first direction and for driving the second drive roller in a second direction opposite said first direction.

Yet another aspect of the invention comprises a method of transferring articles that includes providing a planar support surface, providing a first conveyor having a load carrying surface, and placing the first conveyor on the support surface such that the load carrying surface is located a first distance from the planar support surface. The method also includes providing a lift table shiftable between a lowered configuration and a raised configuration, where the lift table in the lowered configuration has a first height, and placing the lift table adjacent to the first conveyor on the planar support surface. The method further includes providing a second conveyor having a bottom and a load carrying surface and a lift-table receiving opening, the second conveyor load carrying surface being spaced from the bottom by a second distance, where a sum of the first height and the second distance is greater than the first distance, and placing the second conveyor on the lift table with a portion of the lift table in the lift-table-receiving opening so that a second height, from the planar support surface to the second conveyor load carrying surface, is less than the sum of the first height and the second distance. The method also includes transferring an article from the second conveyor to the first conveyor.

BRIEF DESCRIPTION OF THE DRAWINGS

These and other aspects and features of embodiments of the present invention will be better understood after a reading of the following detailed description together with the attached drawings wherein:

FIG. 9 is a side elevational view of the conveyor of FIG. 6.

FIG. 12 is a side elevational view of a system including the conveyor of FIG. 6 mounted on a lift table.

DETAILED DESCRIPTION

Figure 1:
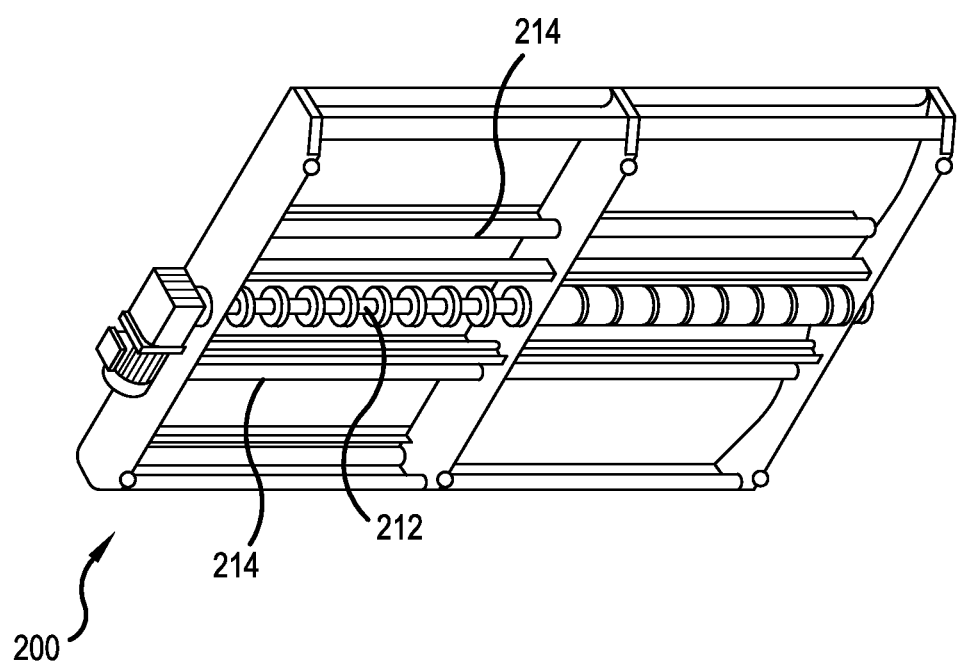
FIG. 1 is a perspective view of the bottom of a conventional conveyor.
Figure 2:
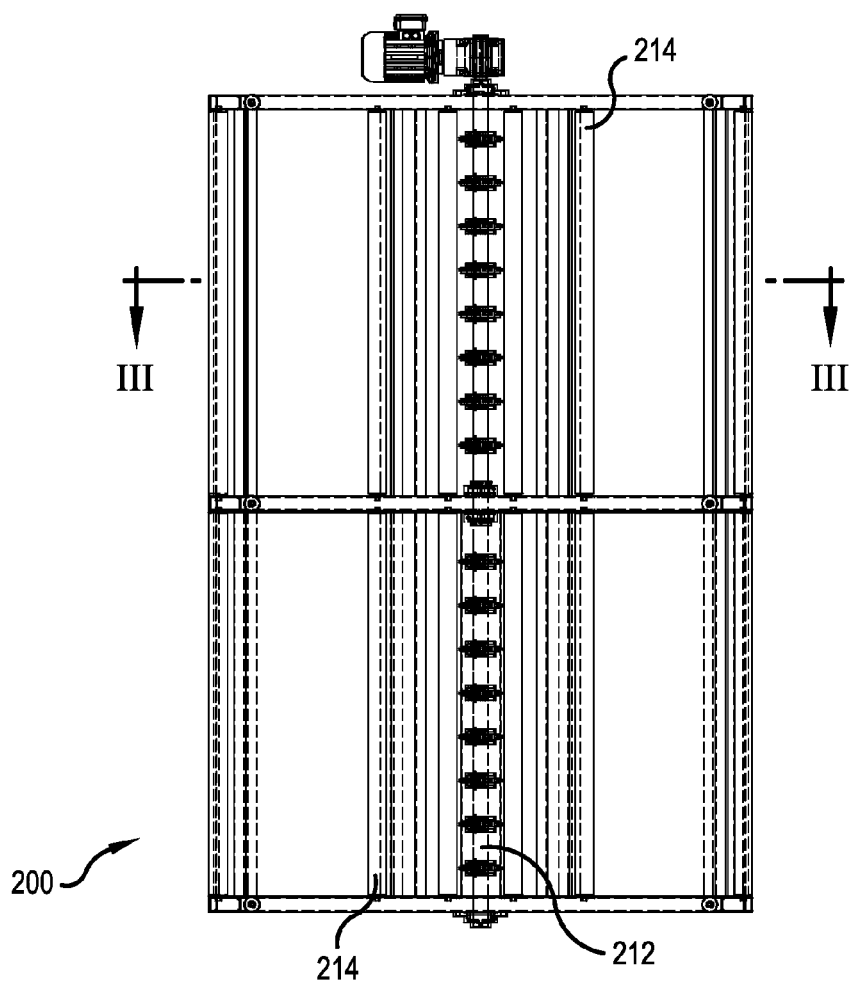
FIG. 2 is a bottom plan view of the conveyor of FIG. 1.
Figure 3:
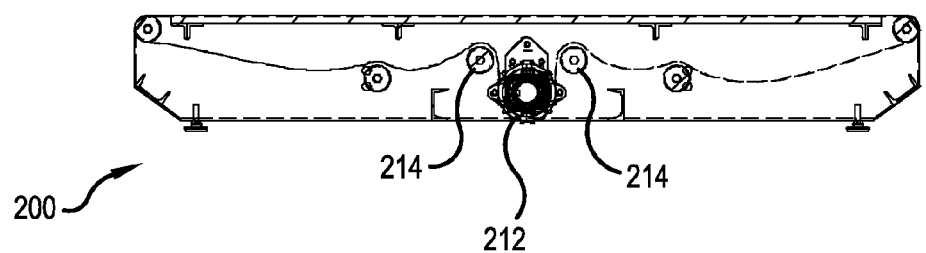
FIG. 3 is sectional elevational view taken in the direction of line III-III in FIG. 2.
Figure 4:
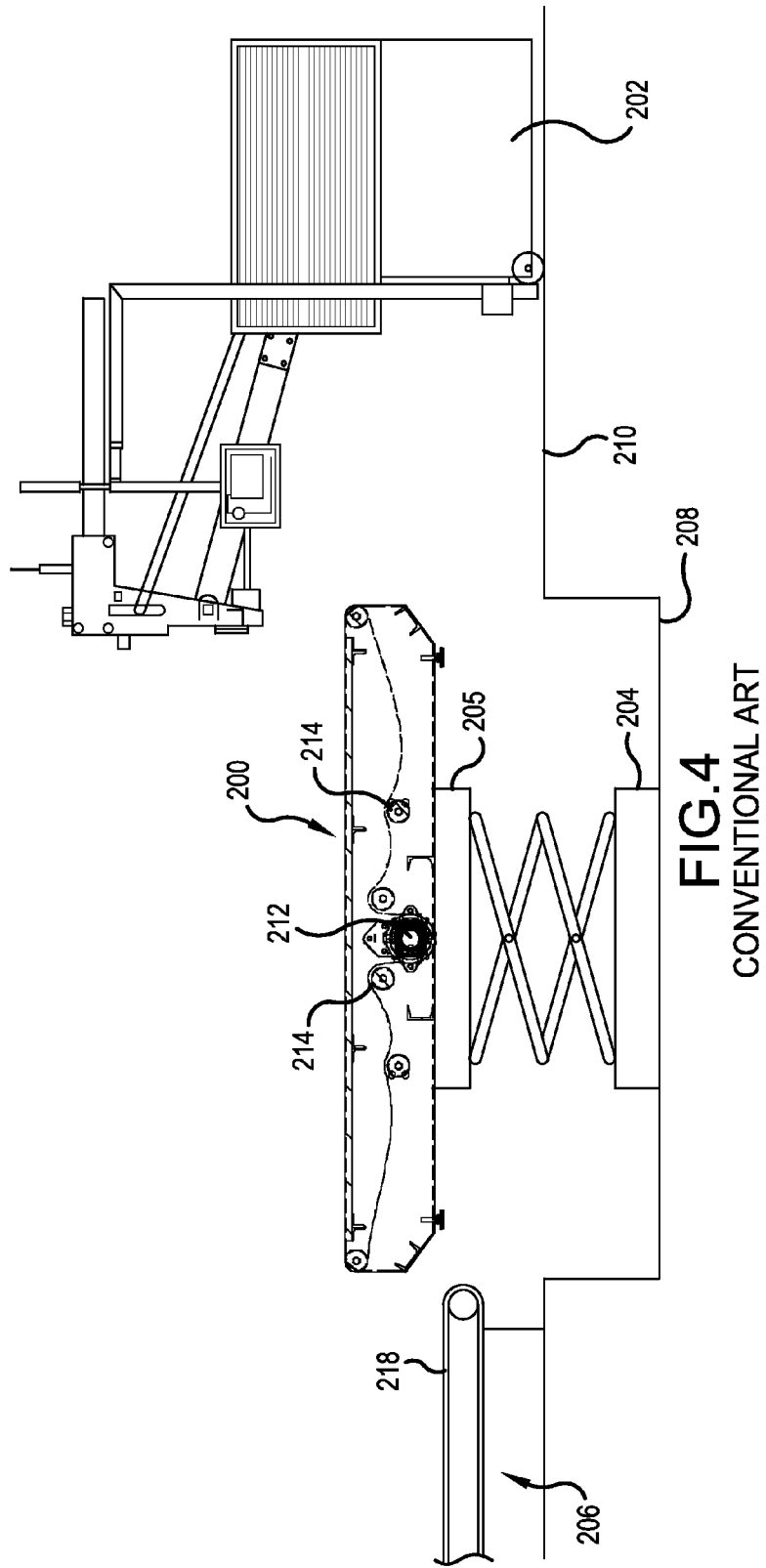
FIG. 4 is a side elevational view of a system including a lift table in a raised position mounted in a pit and supporting the conveyor of FIG. 1.
Figure 5:
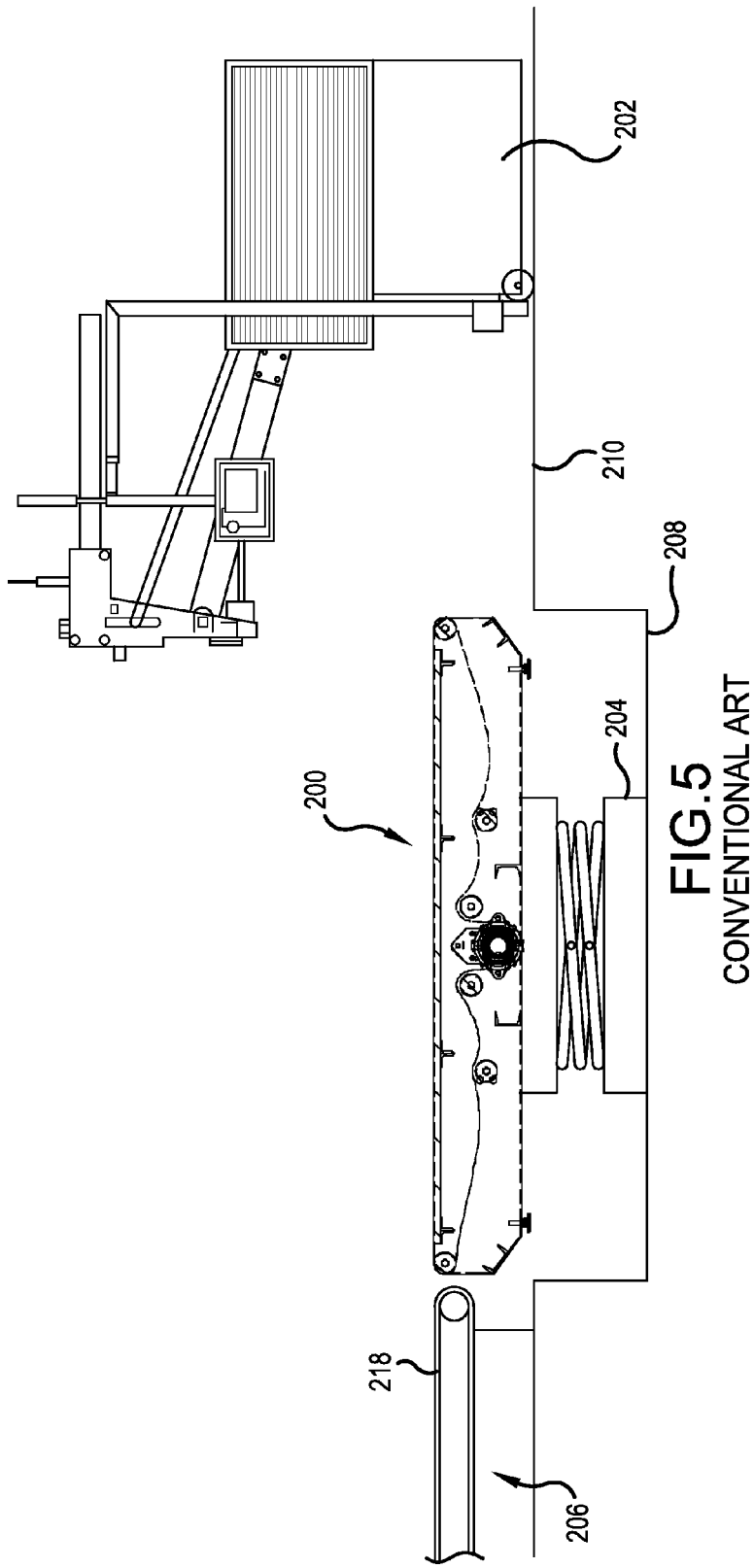
FIG. 5 is a side elevational view of the system of FIG. 4 showing the lift table in a lowered position.
Figure 6:
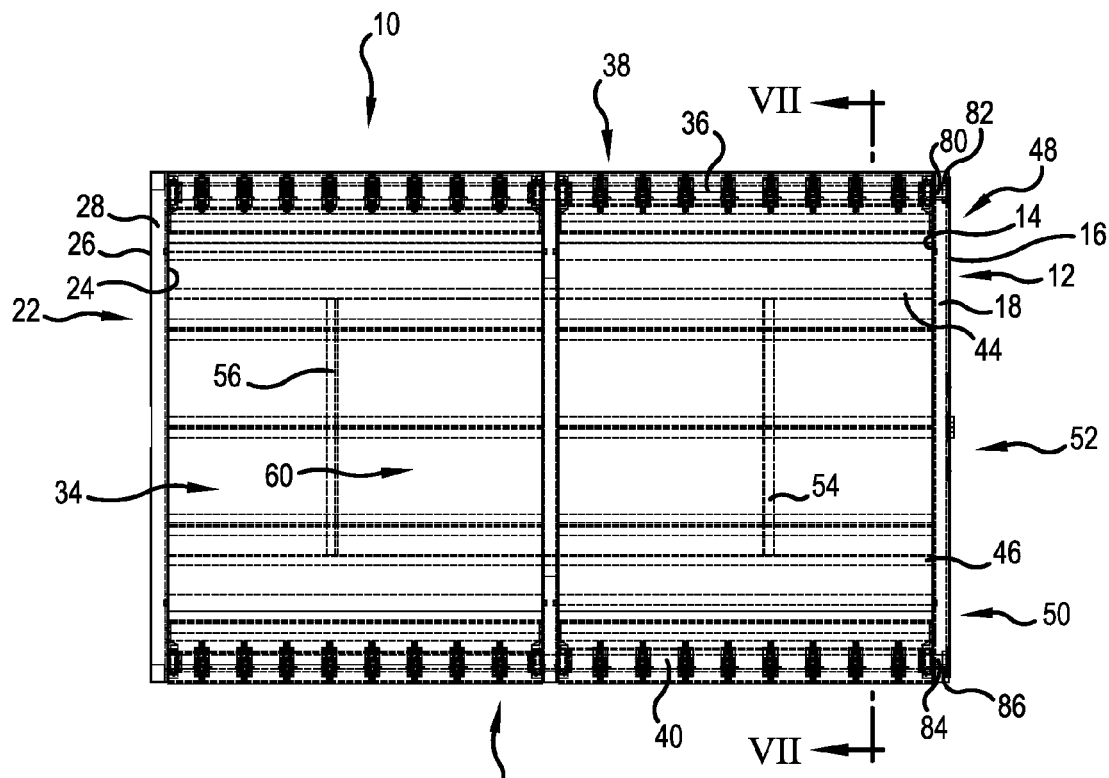
FIG. 6 is a bottom plan view of a conveyor according to an embodiment of the present invention.

Referring now to the drawings, wherein the showing are for illustrating presently preferred embodiments of the invention only and not for the purpose of limiting same, FIG. 6 shows a conveyor 10 according to an embodiment of the present invention. Conveyor 10 includes a first frame element 12 having an inner side 14, an outer side 16, a top 18 and a bottom 20, and a second frame element 22 parallel to and spaced from the first frame element 12. The second frame element 22 includes an inner side 24 facing the inner side 14 of the first frame element, an outer side 26, a top 28 and a bottom 30. The bottom 20 of the first frame element 12 (FIG. 8) and the bottom 30 of the second frame element 22 both lie in a common plane (not specifically illustrated) and form the bottom of the conveyor 10. The volume bounded by the inner sides 14, 24 of the first and second frame elements 12, 22 and the common plane in which the bottoms 20, 30 of the first and second frame elements 14, 22 lie define a conveyor interior 34.

Figure 7:
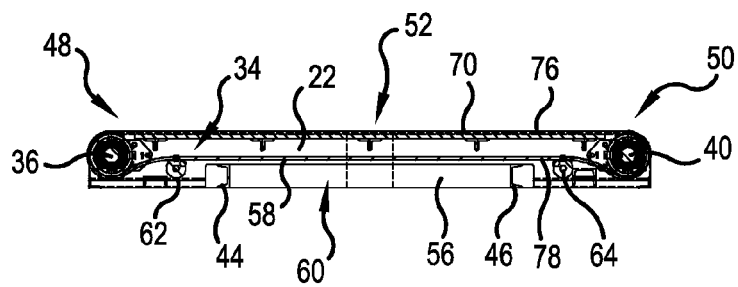
FIG. 7 is a sectional elevational view taken in the direction of line VII-VII in FIG. 6.

A first drive roller 36 is connected between the first frame element 12 and the second frame element 18 at a first end 38 of the conveyor 10, and a second drive roller 40 is connected between the first and second frame elements 12, 14 at the second end 42 of the conveyor 10. The conveyor interior 34 includes a first transverse support 44 and a second transverse support 46 connected between the first and second frame elements 12, 22 and parallel to the first and second drive rollers 36, 40. The portion of the conveyor 10 between the first transverse support 44 and the first end 38 of the conveyor 10, which includes the first drive roller 36, may be referred to herein as the first end portion 48 of the conveyor 10, the portion of the conveyor 10 between the second transverse support 46 and the second end 42 of the conveyor 10 may be referred to herein as the second end portion 50 of the conveyor 10, and the portion of the conveyor 10 from the first transverse support 44 and the second transverse support 46 may be referred to as the central portion 52 of the conveyor 10. A first longitudinal brace 54 and a second longitudinal brace 56 connect the first and second transverse supports 44, 46 at locations inward of the first and second frame elements 12, 22, and a plate 58 (FIG. 7) is connected to the first and second transverse supports 44, 46 and first and second longitudinal braces 54, 56 and defines therewith a lift-table-receiving space 60 within the conveyor interior 34. A first tensioning roller 62 is connected between the first frame element 12 and the second frame element 22 in the first end portion 48 of the conveyor interior 34, and a second tensioning roller 64 is connected between the first frame element 12 and the second frame element 22 in the second end portion 50 of the conveyor interior 34.

Figure 10:
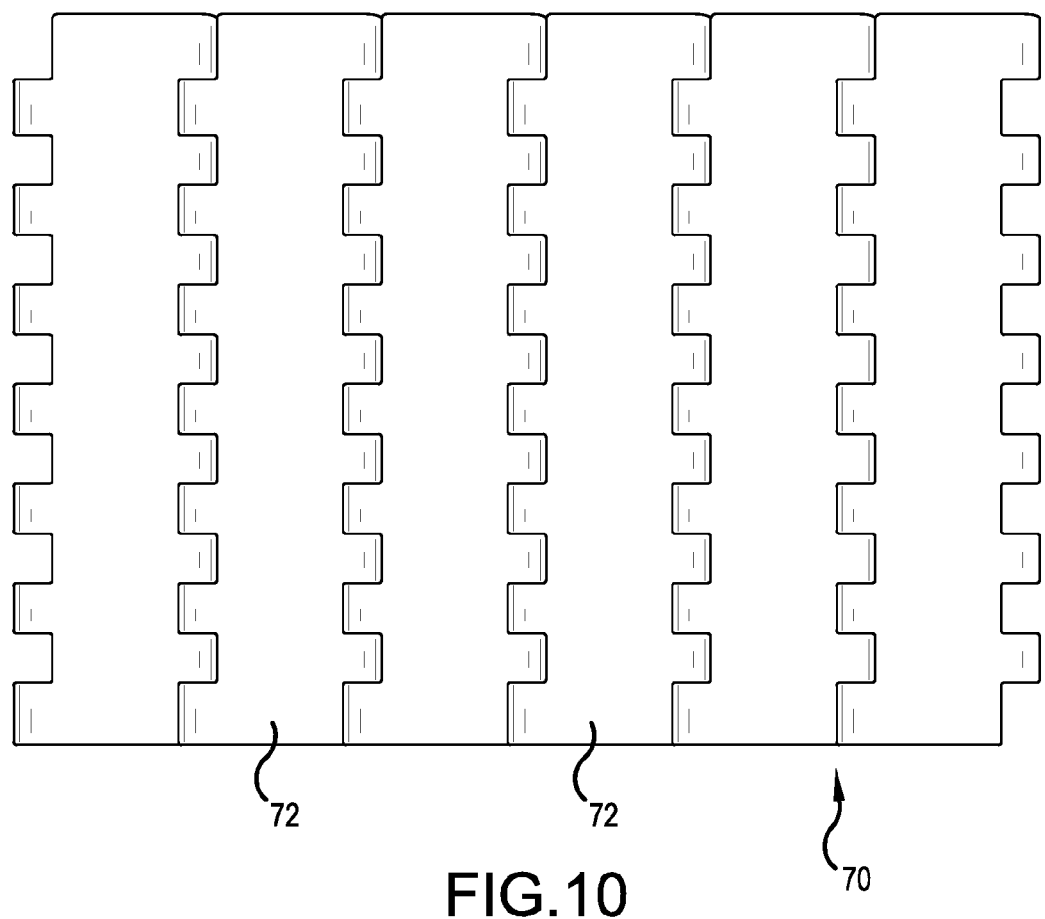
FIG. 10 is a top plan view of a section of flexible belt for the conveyor of FIG. 6.
Figure 11:
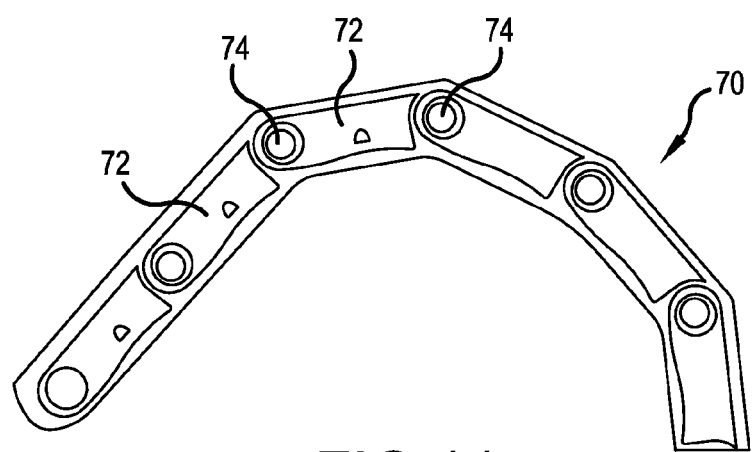
FIG. 11 is a side elevational view of the belt of FIG. 10 in a curved configuration.

A flexible belt 70, a segment of which is illustrated by itself in FIGS. 10 and 11, comprises a series interconnected rigid plastic elements 72 jointed by hinge pins 74. A belt formed of a reinforced polymer material and/or a fabric (not illustrated) or any other conventional, flexible, belt, could also be used. The flexible belt 70 is mounted on the first and second driver rollers 36, 40, and includes a load carrying portion 76 near the tops 18, 28 of the first and second frame elements 12, 22 and a return portion 78 that runs through the interior 34 of the conveyor 10. The first and second tensioning rollers 62, 64 push the return portion 78 of the belt 70 toward the load carrying portion 76 and hold the return portion 78 of the belt 70 between the plate 58 and the load carrying portion 76 of the belt 70 in the central portion 52 of the conveyor interior 34. The positions of the first and second tensioning rollers 62, 64 and/or the force they exert on the return portion 78 of the belt 70 are adjustable to maintain a desired tension on the belt 70.

Figure 8:
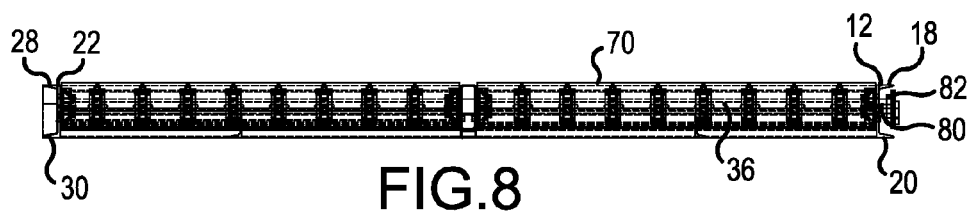
FIG. 8 is an end elevational view of the conveyor of FIG. 6.
Figure 13:
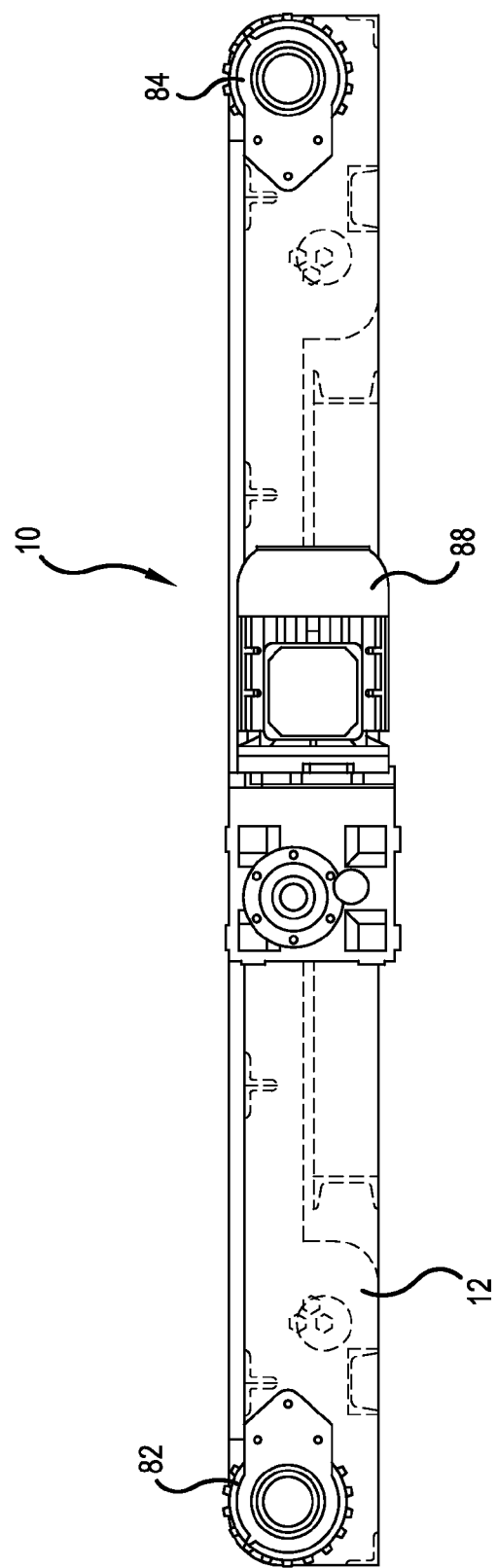
FIG. 13 is a side elevational view of the conveyor of FIG. 6 showing the location of a motor.

With reference to FIGS. 6 and 8, an end portion 80 of the first drive roller 36 projects through the first frame element 12 in the first end portion 48 of the conveyor 10 and has a first drive wheel 82, which may comprise a sprocket 82, mounted thereon; similarly, an end portion 84 of the second drive roller 40 projects through the first frame element 12 in the second end portion 50 of the conveyor 10 and has a second drive wheel 86, which may comprise a sprocket 86, mounted thereon. A drive 88, illustrated in FIG. 13, is mounted on the outer side 16 of the first frame element 12, and includes a drive sprocket 90 that is turned by the drive 88 and which can be seen in FIG. 9 in which the drive 88 has been removed for illustration purposes. A drive chain 92 connects the sprocket 90 of the drive 88 to the first drive sprocket 82 and the second drive sprocket 86, and tensioning sprockets 94 are adjustable to maintain a desired tension on the drive chain 92. A belt drive (not illustrated) could also be used with flanged drive wheels (not illustrated) configured to guide and retain the belt. Mounting the drive chain 92 and the first and second drive sprockets 82, 86 on the outer side 16 of the first frame element 12 increases the space beneath the flexible belt and provides room for the lift-table-receiving space 60 in the conveyor interior 34. However, it would also be possible to mount the first and second drive sprockets 82, 86 on the inner side 14 of the first frame element if sufficient space is provided for these elements between the belt 70 and the first frame element 12.

The drive shaft 212 and associated tensioning rollers 214 of conventional conveyors are centrally located on the bottom of the conveyor in order to allow the conveyor to be driven in two directions. If the drive shaft 212 were located at one end of the conveyor, it would be possible to drive the conveyor in only one direction by pulling the conveyor belt along the top of the conveyor toward the drive shaft. Conventional conveyor belts are flexible, and a flexible belt cannot be driven by pushing on the belt. Thus, it is generally considered necessary to provide a centrally disposed drive shaft to allow the conveyor to be driven in two directions. Indeed, conveyor manufacturers are sometimes reluctant to move drive shafts even slightly off center on the ground that this may increase wear and lead to premature failure of the belt and/or drive components. Using such a conventional system, it is not possible to provide sufficient space beneath the conveyor to accommodate a lift table and to drive the conveyor in two directions.

By providing first and second drive rollers 36, 40 at either end of the conveyor 10, and equipping them with first and second drive sprockets 80, 82, on the outer side 16 of the first frame element 12, rather than using a centrally mounted drive shaft as in the conventional art, a conveyor is constructed with a lift-table-receiving space 60 in the conveyor interior 34, which is not possible with a conventional design. Because both the first and second drive rollers 36, 40 are connected to the drive 88, the flexible belt 70 can be driven in both directions. While this arrangement is more expensive than the design of a conventional conveyor having a central drive shaft, it is less expensive than the cost of a conventional conveyor and the labor involved in constructing a pit and thus reduces overall costs and allows for greater flexibility in the positioning of equipment.

With reference to FIG. 12, the conveyor 10 is mounted on the lift table 204 with the platform 205 of the lift table 204 inside the lift-table-receiving space 60 and the plate 58 resting on the platform 205. Preferably, the locations of the first and second transverse supports 44, 46 and the first and second longitudinal braces 54, 56 are selected to define a lift-table-receiving opening 60 that is approximately the same size as the lift table platform 205 to securely hold the conveyor on the lift table platform 205. The adjacent conveyor 206 has a load carrying surface 218 that is located a first distance above floor 210, generally 12 inches, and the lift table 204 has a first height from the floor 210 to the top of platform 205. The load carrying portion 76 of the flexible belt 70 is located a second distance from the bottoms 20, 30 of the first and second frame elements 12, 22. With the platform 205 mounted in the lift-table-receiving space 60 of the conveyor 10, the combined height of the lift table 204 and the conveyor 10 mounted thereon is less than or equal to the first distance. In this manner, the load carrying portion 76 of the flexible belt 70 of the conveyor 10 can be aligned with the load carrying surface 218 of the adjacent conveyor 206 to allow objects and/or stacks of objects to be transferred back and forth between the conveyor 10 and the adjacent conveyor 206 without the need for a pit 208.

Figure 14:
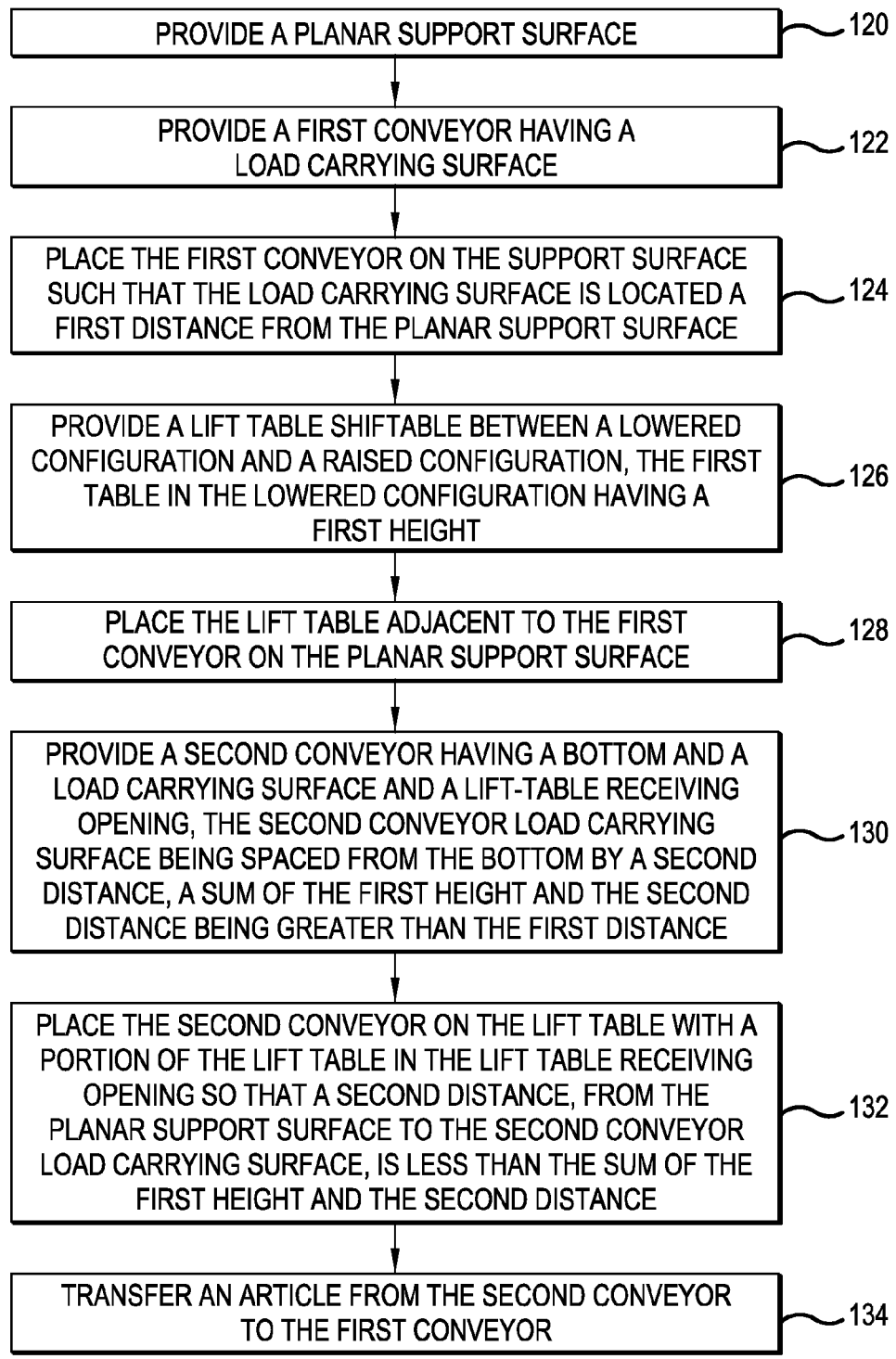
FIG. 14 is a flow chart illustrating a method according to an embodiment of the present invention.

A method according to an embodiment of the present invention is illustrated in FIG. 14 and includes a step 120 of providing a planar support surface, a step 122 of providing a first conveyor having a load carrying surface, and a step 124 of placing the first conveyor on the support surface such that the load carrying surface is located a first distance from the planar support surface. The method also includes a step 126 of providing a lift table shiftable between a lowered configuration and a raised configuration, the lift table in the lowered configuration having a first height, and a step 128 of placing the lift table adjacent to the first conveyor on the planar support surface. The method further comprises a step 130 of providing a second conveyor having a bottom and a load carrying surface and a lift-table receiving opening, the second conveyor load carrying surface being spaced from the bottom by a second distance, a sum of the first height and the second distance being greater than the first distance, a step 132 of placing the second conveyor on the lift table with a portion of the lift table in the lift-table-receiving opening so that a second height, from the planar support surface to the second conveyor load carrying surface, is less than the sum of the first height and the second distance and a step 134 of transferring an article from the second conveyor to the first conveyor.

The present invention has been described herein in terms of one or more presently preferred embodiments. Modifications and additions to these embodiments will become apparent to those of ordinary skill in the art upon a reading of the foregoing description. It is intended that all such modifications and additions form a part of the present application to the extent they fall within the scope of the several claims appended hereto.

What is claimed is:

1. A conveyor comprising a frame having first and second spaced frame elements having outer sides and facing inner sides, first and second drive rollers between the first and second frame elements, a flexible belt mounted on the first and second drive rollers, first and second drive wheels connected to the first and second drive rollers, and a drive operably connected to the first and second drive wheels and configured to drive the belt in a first direction and in a second direction opposite the first direction, wherein the conveyor comprises a first end portion including the first drive roller, a second end portion including the second drive roller and a central portion including a midpoint between the first drive roller and the second drive roller, and wherein said first frame element and said second frame element each include a top and a bottom, and wherein a conveyor interior volume is bounded by said first frame element and said second frame element and a plane including said first frame element bottom and said second frame element bottom, and wherein said conveyor interior volume includes a lift-table-receiving space in said central portion, said belt not extending into said lift-table-receiving space.

2. The conveyor of claim 1 including a lift mechanism extending into the lift-table-receiving space.

3. The conveyor of claim 1 including a lift table having a platform, the platform extending into the lift-table-receiving space.

4. A conveyor comprising a frame having first and second spaced frame elements each having a top, a bottom, an outer side and an inner side, the inner side of the first frame element facing the inner side of the second frame element, first and second drive rollers between the first and second frame elements, a flexible belt mounted between the first and second drive rollers, the belt having a load bearing portion and a return portion, the return portion extending between the inner sides of the first and second frame elements, wherein the conveyor comprises a first end portion including the first drive roller, a second end portion including the second drive roller and a central portion including a midpoint between the first drive roller and the second drive roller, and wherein the central portion of the conveyor includes a lift-table receiving space between said first drive roller and said second drive roller and between said first frame element and said second frame element, the return portion of the belt extending between the load bearing portion and the lift-table-receiving space.

5. The conveyor of claim 4 including a lift table having a support platform in said lift-table-receiving space.

6. The conveyor of claim 4, including a first drive wheel connected to the first drive roller and a second sprocket connected to the second drive roller and a drive having a drive sprocket, and a drive chain connecting the first and second sprockets to the drive sprocket.

7. The conveyor of claim 4, wherein the first sprocket and the second sprocket are mounted on the outer side of the first frame element.

8. A conveyor comprising a frame having first and second spaced frame elements having outer sides and facing inner sides, first and second drive rollers between the first and second sides, a flexible belt mounted on the first and second drive rollers, and drive means for driving the first drive roller in a first direction and for driving the second drive roller in a second direction opposite said first direction.

9. The conveyor of claim 8, including a lift table extending into a space between the first and second frame elements.

10. The conveyor of claim 8, wherein said drive means includes a drive, a first sprocket connected to said first drive roller, a second sprocket connected to said second drive roller and a drive chain connecting said first sprocket, said second sprocket and said drive.

11. A method of transferring articles comprising:
providing a planar support surface;
providing a first conveyor having a load carrying surface;
placing the first conveyor on the support surface such that the load carrying surface is located a first distance from the planar support surface;
providing a lift table shiftable between a lowered configuration and a raised configuration, the lift table in the lowered configuration having a first height;
placing the lift table adjacent to the first conveyor on the planar support surface; providing a second conveyor having a bottom and a load carrying surface and a lift-table receiving opening, the second conveyor load carrying surface being spaced from the bottom by a second distance, a sum of the first height and the second distance being greater than the first distance;
placing the second conveyor on the lift table with a portion of the lift table in the lift-table-receiving opening so that a second height, from the planar support surface to the second conveyor load carrying surface, is less than the sum of the first height and the second distance; and
transferring an article from the second conveyor to the first conveyor.

12. The method of claim 11, wherein the second height is less than or equal to the first distance.

13. The method of claim 11, including operating said second conveyor to move said second conveyor load carrying surface in a first direction, stopping said second conveyor and operating said second conveyor to move said second load carrying surface in a second direction opposite said first direction.

\* \* \* \* \*